(12) United States Patent
Moreno et al.

(10) Patent No.: US 10,376,436 B2
(45) Date of Patent: Aug. 13, 2019

(54) CONVEYOR MECHANISM WITH ILLUMINATED CHAMBER FOR CONCEALING COFFIN

(71) Applicant: GRUPO GAYOSSO S.A. DE C.V., Mexico City (MX)

(72) Inventors: Guillermo Alejandro Moreno, Mexico City (MX); Abigail Alejandro Sosa Hernandez, State of Mexico (MX)

(73) Assignee: GRUPO GAYOSSO S.A. DE C.V., Mexico City (MX)

( * ) Notice: Subject to any disclaimer, the term of this patent is extended or adjusted under 35 U.S.C. 154(b) by 0 days.

(21) Appl. No.: 16/120,793

(22) Filed: Sep. 4, 2018

(65) Prior Publication Data

US 2019/0099314 A1    Apr. 4, 2019

(30) Foreign Application Priority Data

Sep. 4, 2017    (MX) ............... MX/u/2017/000383 U

(51) Int. Cl.
| | |
|---|---|
| *F23G 1/00* | (2006.01) |
| *A61G 19/00* | (2006.01) |
| *B65G 13/11* | (2006.01) |
| *E04H 13/00* | (2006.01) |

(52) U.S. Cl.
CPC ............ *A61G 19/00* (2013.01); *B65G 13/11* (2013.01); *E04H 13/00* (2013.01); *B65G 2201/0214* (2013.01); *F23G 1/00* (2013.01)

(58) Field of Classification Search
CPC .......... A61G 19/00; A61G 21/00; F23G 1/00; B65G 2201/0214; B65G 13/11; E04H 13/00

See application file for complete search history.

(56) References Cited

U.S. PATENT DOCUMENTS

| | | | | |
|---|---|---|---|---|
| 4,890,367 | A  * | 1/1990 | Crawford | ............... F23G 1/00 27/26 |
| 6,299,229 | B1 * | 10/2001 | Becenas Nieto | ...... A61G 21/00 296/24.3 |
| 7,882,605 | B2 | 2/2011 | Senn | |
| 7,882,606 | B2 * | 2/2011 | Elhaj | .................. A61G 19/00 27/27 |

(Continued)

FOREIGN PATENT DOCUMENTS

| | | | | |
|---|---|---|---|---|
| JP | 3189817 U | * | 4/2014 | ............. A61G 21/00 |
| MX | 127202 | | 9/1974 | |

(Continued)

*Primary Examiner* — Mark A Deuble
(74) *Attorney, Agent, or Firm* — Alston & Bird LLP

(57) ABSTRACT

The present invention relates to a conveyor mechanism with illuminated chamber for concealment of coffin consisting of a base or travel platform on which a plurality of rollers are arranged, through which it is possible to manually move a coffin from an open or full vision area to a transition zone that conceals said coffin, where the transition zone is defined from a concealment chamber that covers the rear half of the base or travel platform and in which a tunnel is configured through which the coffin is circulated to reach its final destination, a journey that is carried out accompanied by the light provided by at least two reflector lamps arranged at the bottom of the concealment chamber.

4 Claims, 12 Drawing Sheets

(56) References Cited

U.S. PATENT DOCUMENTS

| | | | | |
|---|---|---|---|---|
| 8,474,595 B2 * | 7/2013 | Crass | ............... | B65G 37/00 |
| | | | | 198/358 |
| 8,899,404 B2 * | 12/2014 | Schoepe | ............ | G01V 5/0083 |
| | | | | 198/358 |
| 2009/0174205 A1 * | 7/2009 | Kim | .................. | A61G 21/00 |
| | | | | 296/16 |
| 2016/0252646 A1 * | 9/2016 | Sarraiocco | ......... | G01V 5/0016 |
| | | | | 382/103 |
| 2018/0140494 A1 * | 5/2018 | Schem | ................ | A61G 21/00 |
| 2018/0193980 A1 * | 7/2018 | James | ................. | B24C 3/06 |
| 2019/0002199 A1 * | 1/2019 | Holman | ............ | B65F 1/1468 |

FOREIGN PATENT DOCUMENTS

| | | |
|---|---|---|
| MX | 325894 | 12/2014 |
| MX | 329937 | 5/2015 |
| MX | 333820 | 10/2015 |

\* cited by examiner

CONVEYOR MECHANISM WITH ILLUMINATED CHAMBER FOR CONCEALING COFFIN

CROSS-REFERENCE TO RELATED APPLICATIONS

This application claims priority to Mexican Patent Application No. MX/u/2017/000383 filed Sep. 4, 2017, the contents of which are hereby incorporated by reference in its entirety.

TECHNICAL FIELD OF THE INVENTION

The present utility model is in the field of devices or mechanisms that allow transport coffins and more particularly refers to a roller conveyor mechanism that allows the manual movement of a coffin from an open area or full vision area towards a transition area that conceals said coffin while illuminating it in its travel.

BACKGROUND OF THE INVENTION

Roller conveyors are devices that, as its name indicates, use metal rollers to facilitate the handling and transfer of a great plurality of objects, such as boxes, pallets, tires, drums, platforms, packages, etc., provided that they have a regular bottom, otherwise other devices are often used as the belt conveyor and the helical conveyor, among others. The roller conveyor is used in several industrial processes and warehouses.

Roller conveyors can be driven by gravity, that is, when the force of gravity of the object is used so that the object slides between the rollers; per belt, when rollers are driven by means of a belt that moves them; by chain, which takes place when rollers are driven by means of a chain transmitting the movement from roller to roller, this type of conveyors are suitable for handling heavy-duty objects, such as platforms or drums and by manual force, a condition that is realized when rollers are arranged on an axis or with a mount that freely allows them to turn, when an external force is transmitted or applied to them, so for the case of the proposed utility model, the rotation of the rollers is caused when a manual displacement force is applied on the coffin that disposed on them is desired to move from one position to another.

Examples of some roller conveyors currently known and used are found in the following documents:

Patent MX 333820 B, granted on Oct. 2, 2015, to Laitram, LLC, for the invention entitled "Belt and transversely driven roller conveyor", wherein a conveyor belt of transversal rollers and a conveyor system is disclosed and protected which provides a drive mechanism for driving the rollers in the belt to divert conveyed items. The conveyor belt includes belt rollers wherein each roller is coupled to a pair of conveyor rollers for items of smaller diameter. The drive mechanism of the conveyor system, when actuated selectively, rotates the belt rollers, which rollers rotate the support rollers for the items, to divert the conveyed items towards or away the side of the belt. The gaps between at least some pairs of support rollers for the items allow the entrance of transfer comb teeth to withdraw the remaining items of de end downstream the belt.

Another example is found in patent MX 329937 B, Brien G. Rau, granted on May 7, 2015, titled "Conveyor belt with wear resistant stacked rolls", a conveyor belt is disclosed that has multiple assemblies is of rollers, each roller assembly includes a first roller and a second roller, the first mobile roller being in contact with the second roller, so that the actuation of one of the rollers in a first angular direction causes the rotation of the other roller in a second opposite angular direction The invention also relates to the belt module itself and to the conveyor comprising a belt with a plurality of such modules and a supporting surface which causes the first roller to rotate and move towards the second roller.

Patent MX 325894 B entitled "Conveyors and methods for non-uniform acceleration of conveyed items", granted to Laitram, L.L.C., on Dec. 1, 2014, where conveyors and methods to operate conveyors are disclosed to accelerate conveyed items laterally adjacent through various distances. Conveyors provide a conveyor surface on rollers on a conveyor belt. belt rollers roll on a supporting surface beneath the belt on a conveyor path. As the belt advances, rollers that roll on the support surface rotate in the direction of rotation to accelerate the conveyed items along the belt in the rotation direction. The support surface is adapted in order that its length ($d_i$, $d_2$) in the travel direction varies across the width of the conveyor.

On the other hand, in patent MX 127202, granted on Sep. 3, 1974, to Alvey Inc.; titled "Improvements in roller conveyor with variable transmission", improvements were disclosed in roller conveyor with variable transmission comprising: a plurality of separate load carrying rollers and attached in a common load transport formation; a worm gear that is passed adjacent the conveyor rollers for friction drive contact with the rollers and a friction drive adjusting device, which is functionally placed adjacent to selected pairs of the conveyor rollers.

And finally; in U.S. Pat. No. 7,882,605 B2 granted on Feb. 8, 2011, to Antoine Elhaj, there is disclosed a carriage assembly for coffin having a first and second side rails, a front rail, a rear rail, a plurality of rollers, a back support wall, a back support pad and a retaining strap, wherein said assembly is suitable for transporting coffins with curved bottoms in funeral vehicles.

Based on the teachings from the documents that currently define the state of the art for the utility model of interest, it is possible to say that, since its discovery and until today, roller conveyors have been part of a large number of activities related to the transport of merchandise; wherein its general configuration can be defined as one that comprises a frame having a pair of parallel and separated side rails, between which a plurality of separate conveyor rollers are disposed and rotatably mounted on said frame to thereby integrate a generally flat conveyor surface, wherein said rollers may or may not be activated by a motorized mechanism of rotary drive, thus having that the differences between the various roller conveyors known to date, lies in the particularities that the object or objects to be conveyed require, as well as the type of drive chosen for the rollers that mounted on a frame define a load and displacement surface.

In view of the above, given the existence of a specific need in the funeral services field, for which to date there is no a concrete solution provided, with the title "Transport mechanism with illuminated camera for concealment of coffin", the present utility model is provided and with following are defined:

BRIEF SUMMARY

An object of the present invention is to provide a conveyor mechanism with illuminated chamber for coffin concealment.

Another object of the present invention is to provide a conveyor mechanism with illuminated chamber for coffin concealment, wherein, the conveyor mechanism is generally defined as a roller conveyor that allows manual movement of a coffin.

Another object of the present invention is to provide a conveyor mechanism with illuminated chamber for concealment of coffin, wherein, the mechanism comprises an uncovered section and another covered section.

Another object of the present invention is to provide a conveyor mechanism with illuminated chamber for coffin concealment, wherein, from the uncovered and covered sections of the mechanism it is possible to move the coffin from a zone of total vision towards a transition zone that conceals said coffin.

Another object of the present invention is to provide a conveyor mechanism with illuminated chamber for coffin concealment, wherein the covered section of the mechanism comprises lighting elements directed to the coffin during its travel to this area.

Still another object of the present invention is to provide a conveyor mechanism with illuminated chamber for concealment of coffin, wherein said mechanism can be incorporated within a funeral parlor.

The objects of the present invention referred to above and even others not mentioned, will be apparent from the description of the utility model and the accompanying figures are presented below.

DETAILED DESCRIPTION

Figure 1:
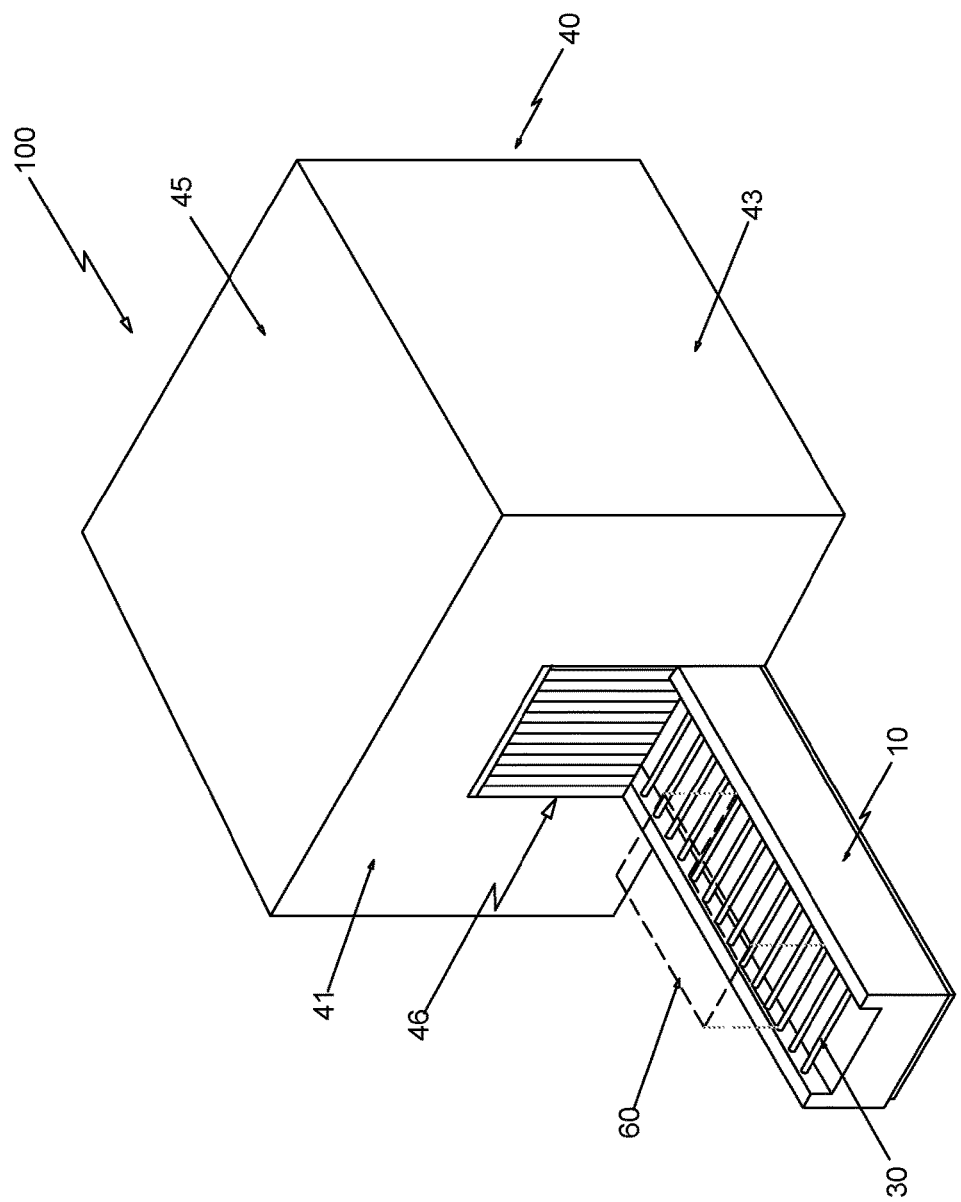
FIG. 1 shows a conventional perspective view of a conveyor mechanism with illuminated chamber for concealment of coffin, made in accordance with the present invention.
Figure 2:
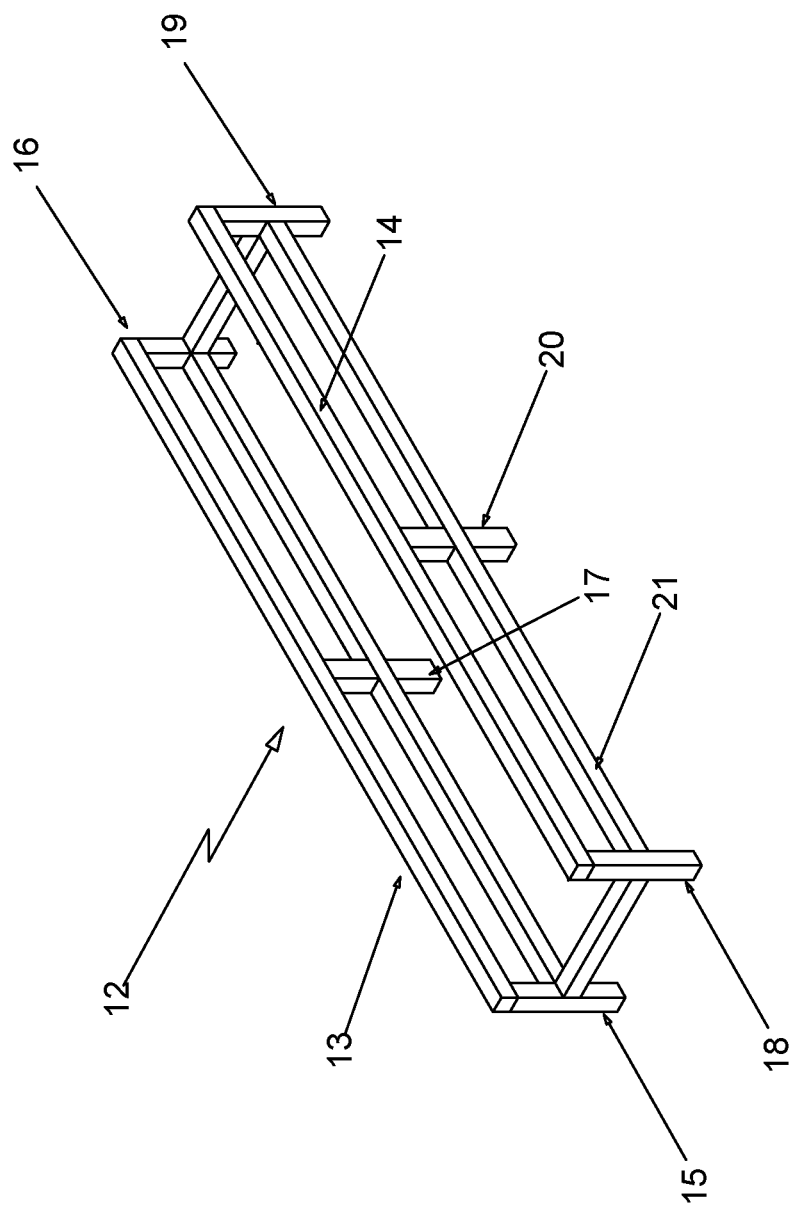
FIG. 2 shows a conventional perspective view of a load frame or support that forms an integral part of the conveyor mechanism of FIG. 1.
Figure 3:
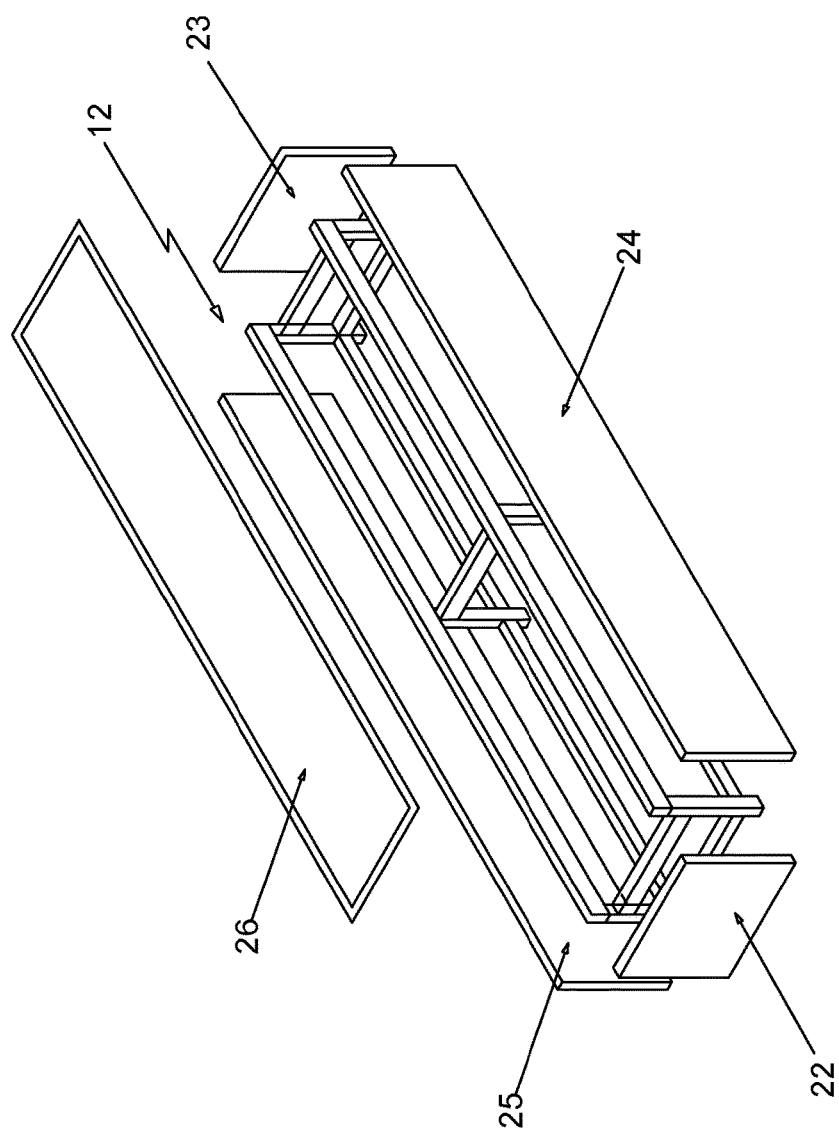
FIG. 3 shows a conventional perspective view of the load frame or support of FIG. 2, before being coated with smooth walls.

As shown in FIGS. 1 to 12, the conveyor mechanism with illuminated chamber for coffin concealment 100 object of the present utility model application, hereinafter referred to as mechanism 100, comprises a base or traveling platform 10 on which a plurality of rollers 30 are arranged by means of these rollers is possible to manually move a coffin 60 from an open or full-vision area to a transition zone, where said coffin 60 is concealed, where the transition zone is defined from a concealment chamber 40 that covers the rear half of the base or platform of displacement 10 and wherein a tunnel is configured through which the coffin 60 is circulated to reach its final destination, that displacement accompanied by light provided by at least two reflector lamps 4-7 arranged inside the concealment chamber 40.

As shown in detail in FIGS. 2 to 6, the base or platform of displacement 10 on which the coffin 60 rests to be able to move it from an open or total vision area towards a transition zone that conceals said coffin 60 and that in general can be understood as a manual roller conveyor, is made up from a frame 12 preferably made of metal, wherein said frame 12 comprises a first 13 and second 14 side rails parallel and spaced apart from one another for a distance, such that between them it is possible to arrange and lock a plurality of rollers 30, wherein the first side rail 13 is supported by at least one front post 15, a rear post 16 and an intermediate post 17 and analogously the second rail side 14 is supported by at least one front post 18, a rear post 19 and an intermediate post 20.

In order to ensure that the frame 12 is able to withstand the load stresses to which it will be subjected during the operation of the mechanism 100, that is, to support and allow the movement of a coffin 60, said frame has been reinforced by a perimeter frame 21 which is disposed below the first 13 and second 14 side rails and which has as attachment points the various posts on which said first 13 and second 14 lateral rails are supported, thus achieving, with said perimeter frame 21 increasing the structural strength of the frame as a whole and of the base or displacement platform 10 that is configured on it in the terms described below.

Figure 4:
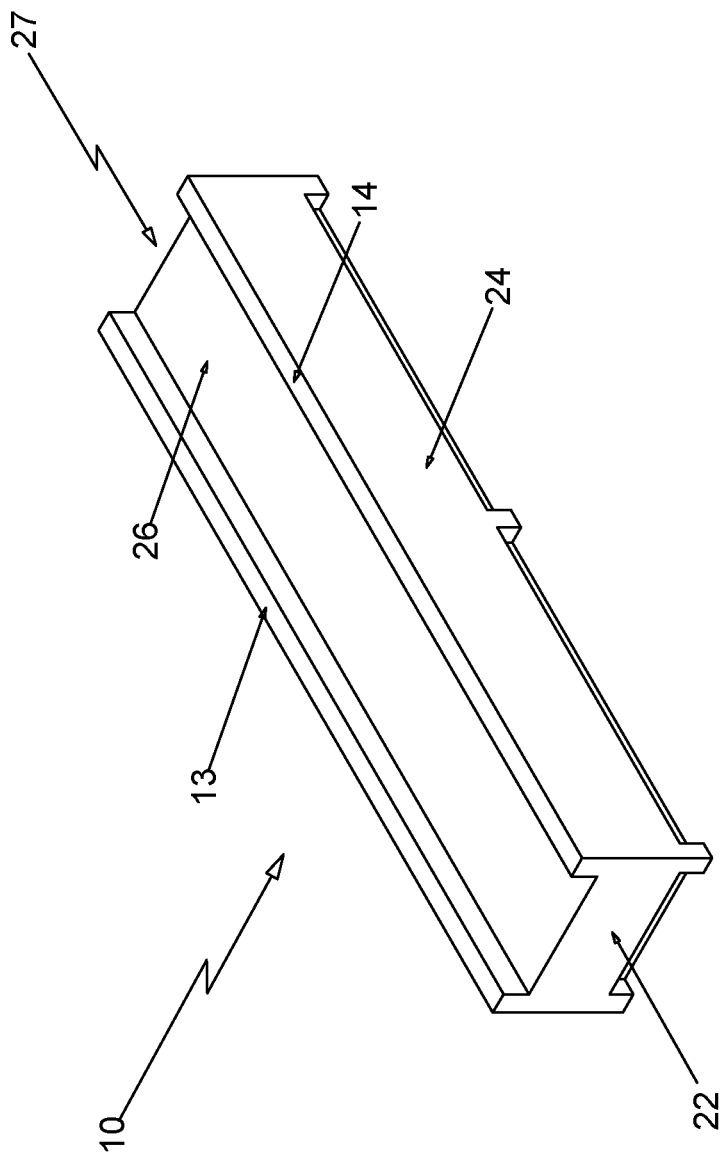
FIG. 4 shows a conventional perspective view of the load frame or support of FIG. 2, once it has been lined with smooth walls.
Figure 5:
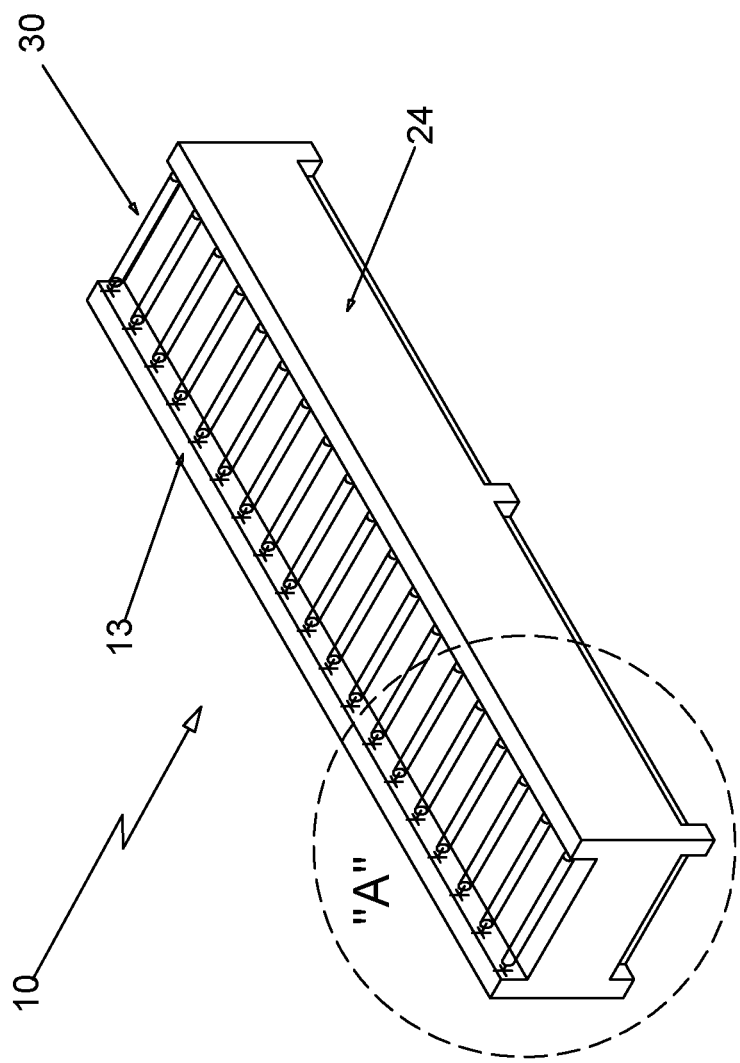
FIG. 5 shows a conventional perspective of the load support or frame of FIG. 2, once it has been lined with smooth walls and a plurality of displacement rollers have been arranged on it forming an integral part of the conveyor mechanism of FIG. 1.
Figure 6:
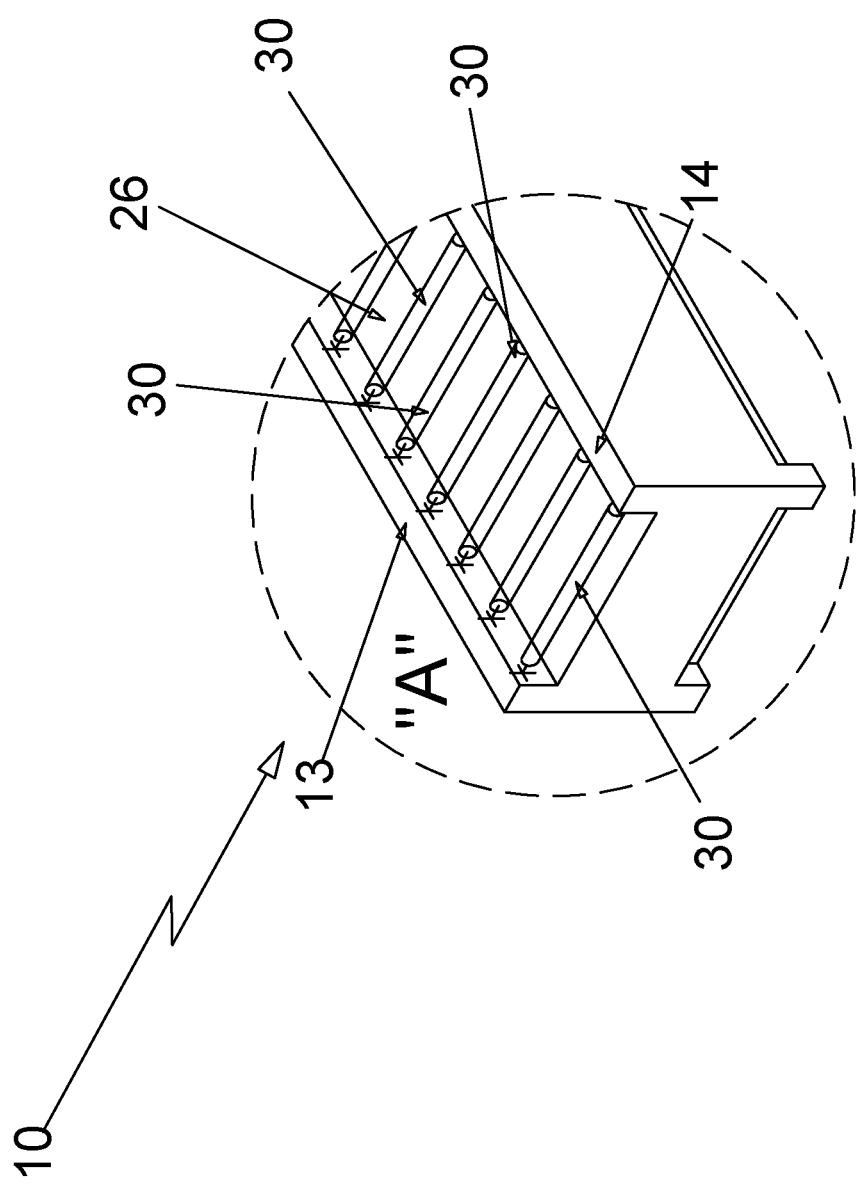
FIG. 6 shows a conventional perspective view of detail "A" of FIG. 5.
Figure 7:
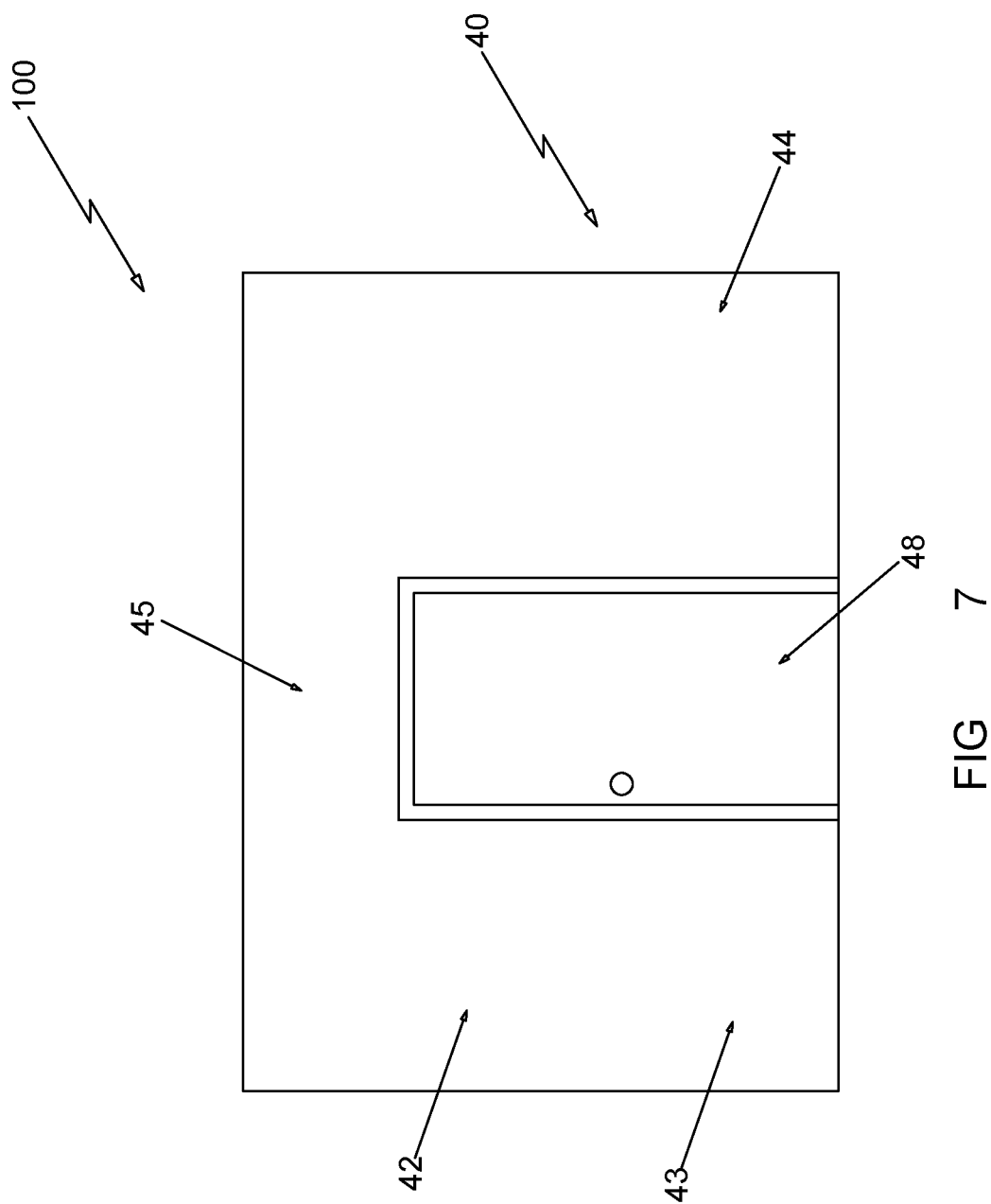
FIG. 7 shows a rear plan view of the conveyor mechanism of FIG. 1.
Figure 8:
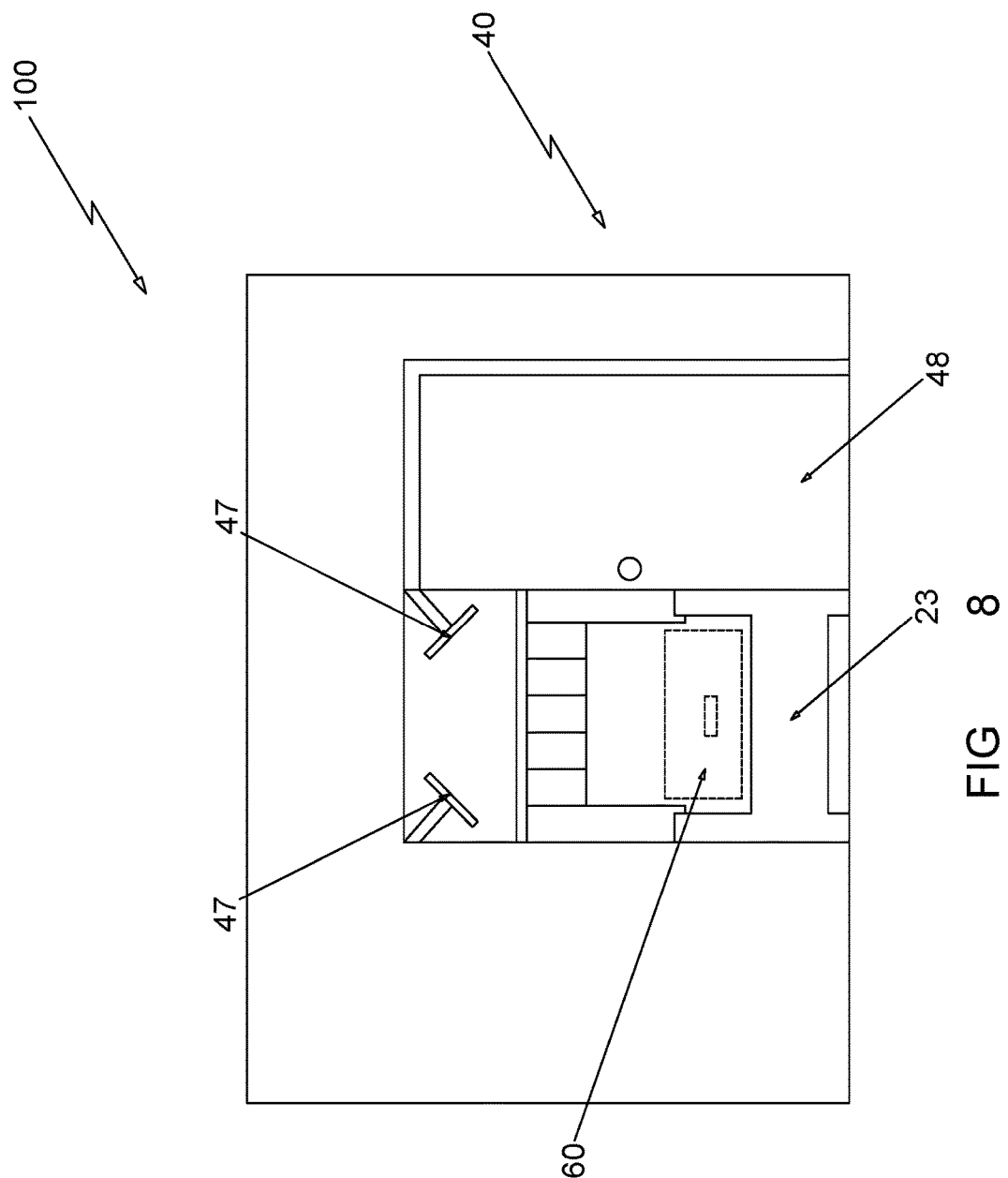
FIG. 8 shows a rear plan view of the conveyor mechanism of FIG. 1, wherein the interior of a transition zone of said mechanism is seen.

In order to improve the aesthetics of the frame 12 and avoid that during the use of the mechanism 100, said frame 12 becomes a distracting, grotesque element or either its appearance is out of tune with the aesthetics and details of a funeral parlor where its use is improved, the frame 12 is lined with smooth walls, namely: an frontal wall 22, a rear wall 23, a right side wall 24, a left side wall 25 and an top wall 26, so that with said lining, the frame 12 achieves a harmonious configuration and then becomes into a base or platform of displacement 10 such as that shown in FIG. 4, on which that travel path 27 is defined for a coffin 60, which advances from one to the other end of the base 10.

On the travel path 27 defined between the first 13 and second 14 side rails and above the top wall 26 that covers the frame 12, a plurality of rollers 30 is arranged on which rollers a coffin 60 will be put to rest, so when a manual force is applied on the opposite end of the travel path 27 related to which it is located and by the rotating effect of rollers 30 on which it rests and the others to be contacted during its travel, it may be moved from an open or total vision area to a transition zone that conceals it.

It is not the intention of the utility model application that is filed, to claim specific aspects on the rollers 30 that are implemented or their assembly on the travel platform 10, since both are widely known elements in the field of roller conveyors, so, suffice it to say that each of the plurality of rollers 30 is capable of freely rotating on its own axis when it is mounted between the first 13 and second 14 side rails of the frame 10, whether mounted with support of bearings, pads or any other element, provided that this assembly allows a free rolling of the roller without losing its arrangement within the arrangement of which it is a part.

Once the structural details of the base or travel platform 10 and the plurality of rollers 30 on it have been disclosed, now based on what is shown in FIGS. 7 to 11, the definition of an open or total vision will be discussed and a transition area that conceals coffin 60 in mechanism 100, as well as the characteristics thereof.

Figure 9:
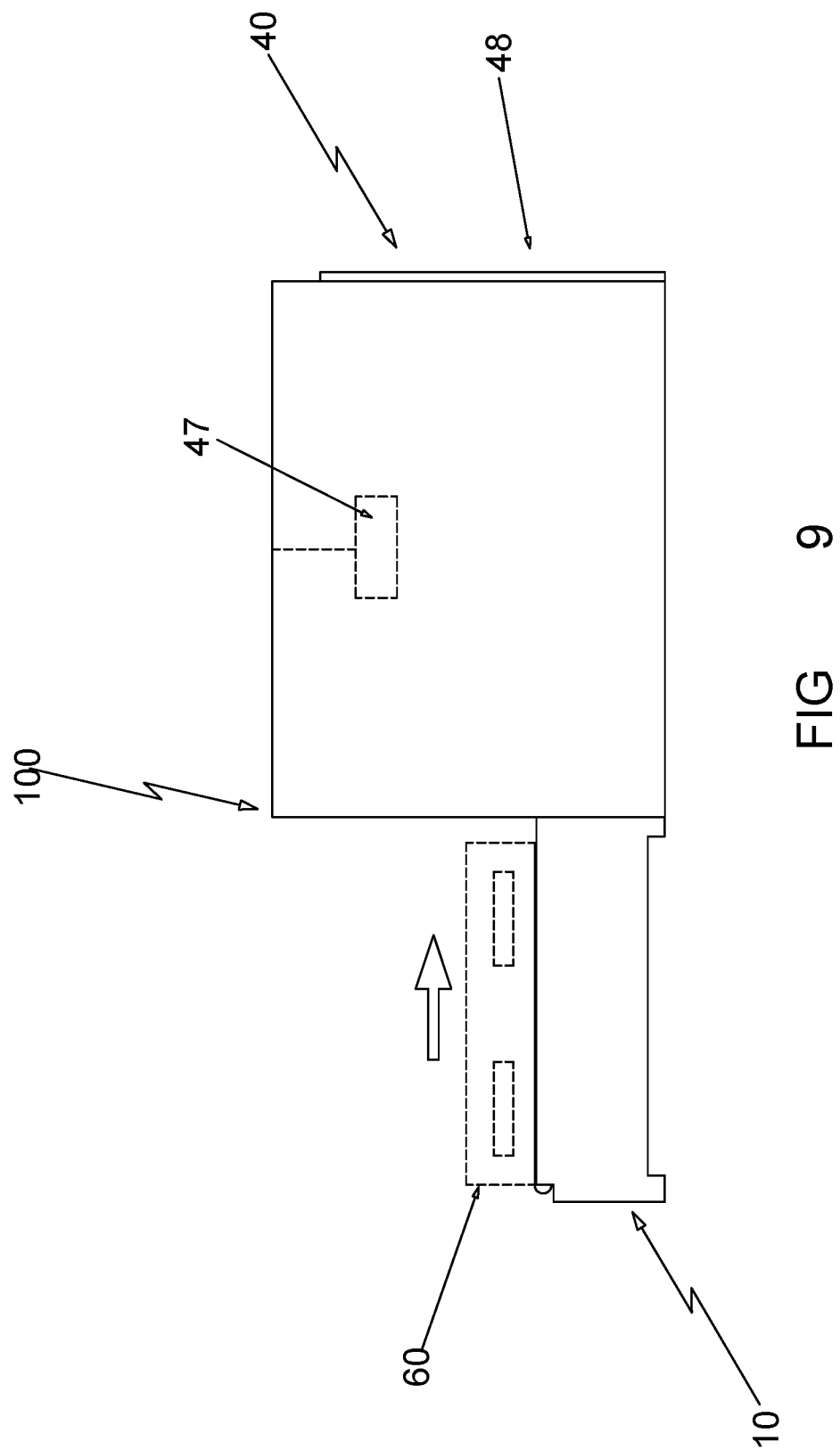
FIG. 9 shows a right side view of the conveyor mechanism of FIG. 1, wherein the position of a coffin on an open area of said mechanism is shown.
Figure 10:
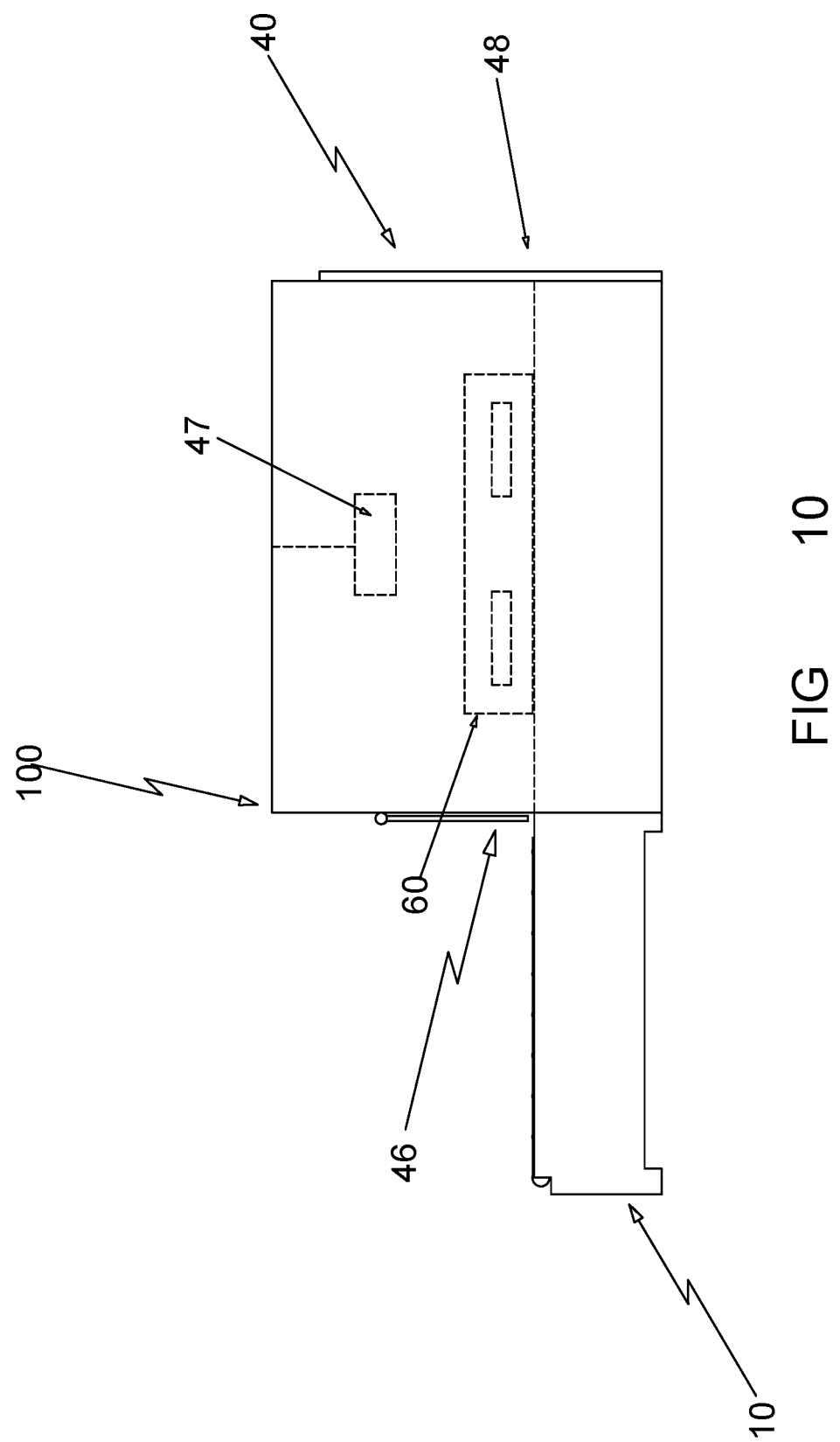
FIG. 10 shows a right side elevation view of the conveyor mechanism of FIG. 1, wherein the position of a coffin over a transition zone of said mechanism is shown.

As mentioned above in mechanism 100, the transition zone is defined from a concealment chamber 40 that covers the rear half of base or travel platform 10, so that the area not covered by said concealment chamber 40 defines itself as the open or full vision area on which it is possible to fully see a coffin 60 arranged on mechanism 100 (see FIG. 9).

The concealment chamber 40 is formed from an front wall 41, a rear wall 42, a right side wall 43, a left side wall 44 and an top wall 45, wherein on the central part of the front wall 41 a recess of about twice the height of the displacement base 10 and the same width of said base 10 has been defined, so that, from said recess it is possible to make approximately half of the displacement platform 10 be within the concealment chamber 40 and wherein, in order to cover the remaining area comprised between the displacement base 10 and the recess of the front wall 41, which by the way is the space through which the coffin 60 will have free access to the interior of the concealment chamber 40, a curtain 46 is arranged which discreetly limits the visual access to the interior of said concealment chamber 40, allowing only to appreciate the lighting effect that is generated inside the chamber 40 by the effect of at least two reflector lamps 47 that accompany the travel of the coffin to a final destination and which, in combination with the walls that make up the chamber 40, generates the optical illusion that the path of the coffin 60 is through a white tunnel.

Figure 11:
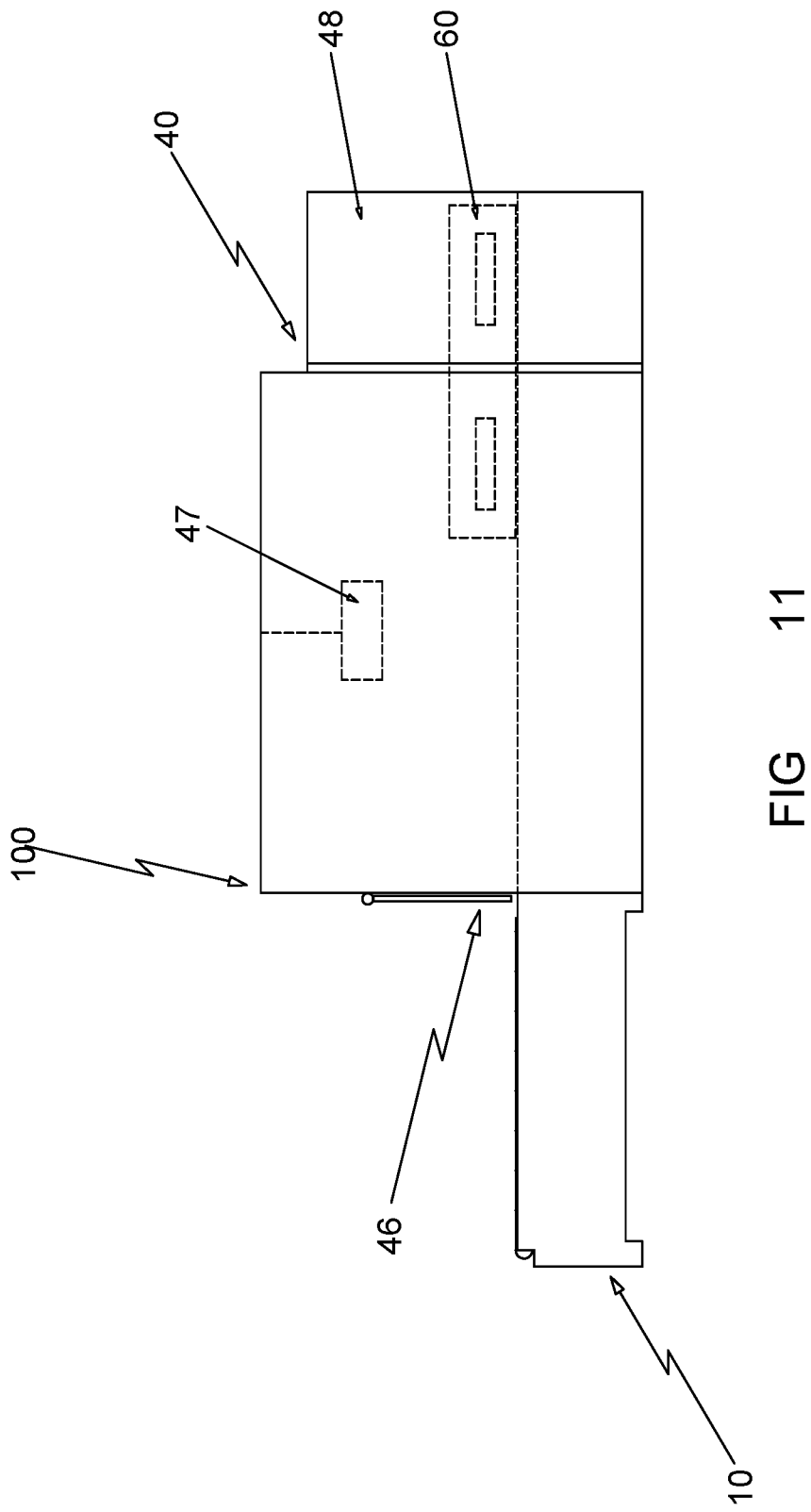
FIG. 11 shows a right side top view of conveyor mechanism of FIG. 1, wherein the exit position of a coffin out of the transition zone of said mechanism is illustrated and FIG. 12 partially shows the conveyor mechanism of FIG. 1, when this is placed inside a funeral parlor, where dashed line represents elements of a possible setting of the funeral parlor.

On the rear wall 42 of the chamber 40, a recess of approximately twice the height of the travel base 10 and the same width of said base 10 has also been defined, so that, from said recess it is possible to remove the Coffin 60 when it has concluded its travel through the transition zone that conceals it (see FIG. 11). In order to reinforce the lighting effect generated inside the chamber 40 by the effect of the at least two reflector lamps 47, said recess of the rear wall 42 is kept closed by means of a door 48 that only opens when it's time to remove the coffin 60 from mechanism 100.

Figure 12:
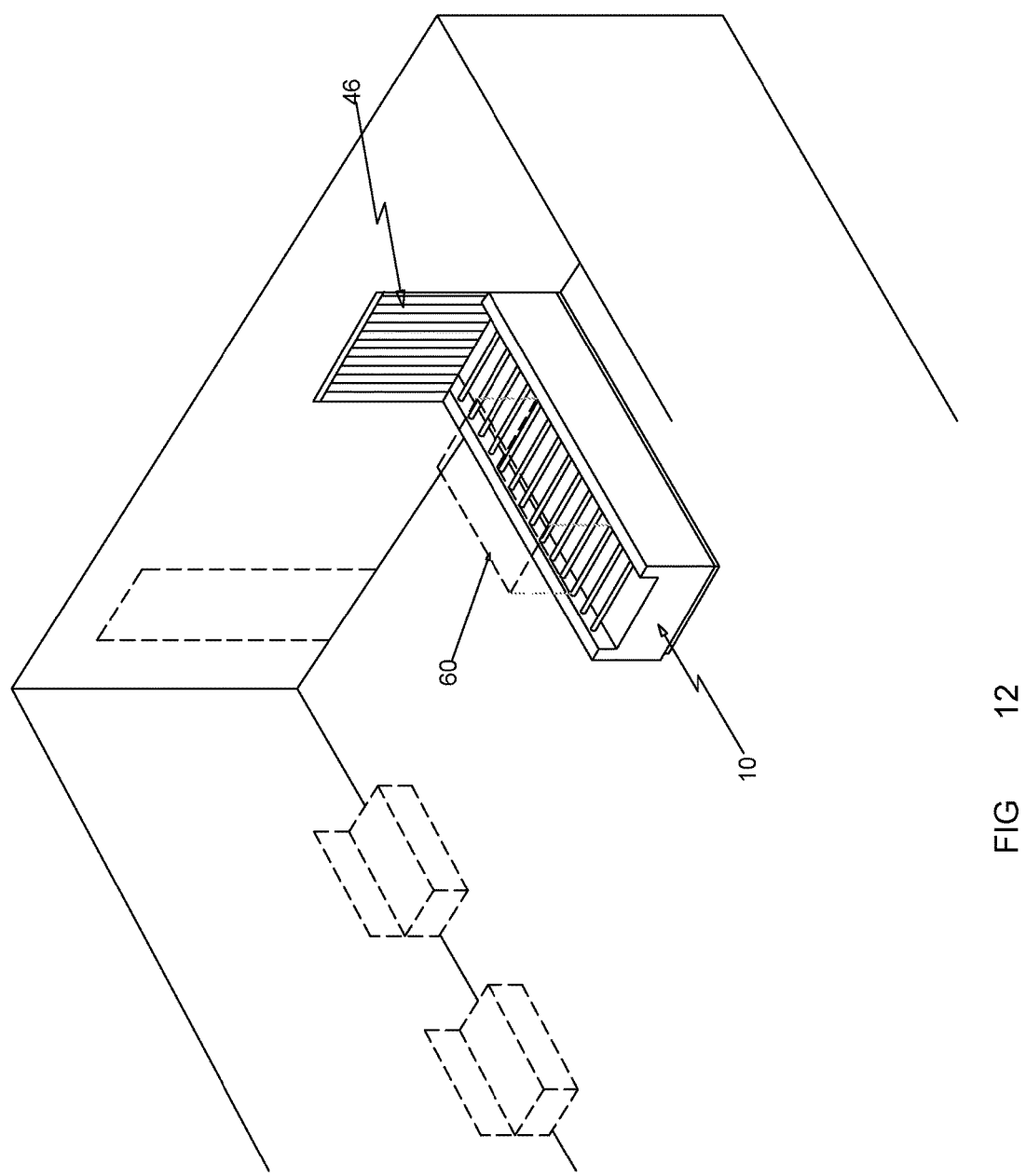

In FIG. 12, the installation of the mechanism 100 inside a funeral parlor is shown, wherein for purposes of total discretion, it is only possible to see the open or total vision area on which a coffin 60 and the curtain are disposed 46 that discreetly limits the visual access to the interior of the concealment chamber 40, that is, the configuration of said concealment chamber 40 is imperceptible to those who are in the funeral room, allowing them only to see the lightning effect generated during the travel of the coffin 60 towards its final destination and which, as mentioned above, simulates a journey through a white tunnel.

Other embodiments not illustrated, but included within the objects of the present invention, should be understood as part of this utility model, such as the inclusion of colors, letters, numbers, figures, signs or textures in each of the elements that integrate the mechanism 100 or the environment where it is installed and that favor their best performance.

The invention claimed is:

1. A conveyor mechanism with an illuminated chamber for concealment of a coffin, comprising:
   a base or platform for movement on which a plurality of rollers are arranged, and through which it is possible to manually move a coffin from an open or full-vision area towards a transition zone that conceals said coffin,
   characterized in that the base or travel platform is lined with smooth walls,
   wherein the transition zone is defined by a concealment chamber covering a rear half of the base or travel platform,
   wherein said concealment chamber comprises a front wall, a rear wall, a right side wall, a left side wall, and a top wall, such that, on a central part of the front and rear walls, a recess is defined,
   wherein, in the case of the front wall, the recess allows a portion of the platform to be within the concealment chamber,
   wherein, in the case of the back wall, the recess allows the coffin to be removed when it has concluded its journey through the transition zone that conceals the coffin,
   wherein, in order to restrict vision of the interior of the concealing chamber, a curtain is arranged on the free space of the recess of the front wall,
   wherein a door covers the recess of the rear wall, and
   wherein, inside the concealment chamber, at least two reflector lamps are arranged so as to generate the visual effect of an illuminated tunnel inside the concealment chamber.

2. The conveyor mechanism according to claim 1, characterized in that; the smooth walls that cover the base or travel platform define a frontal wall, a back wall, a right side wall, a left side wall, and a top wall.

3. The conveyor mechanism according to claim 1, characterized in that; the recesses of both the front wall and the back wall are approximately twice the height of a displacement base and the same width as the displacement base.

4. The conveyor mechanism according to claim 1, characterized in that; the concealment chamber covers approximately half of a displacement platform.

* * * * *